April 7, 1959
G. E. AMMERMAN
2,881,302
ELECTRIC HEATING UNIT
Filed July 24, 1957
2 Sheets-Sheet 1
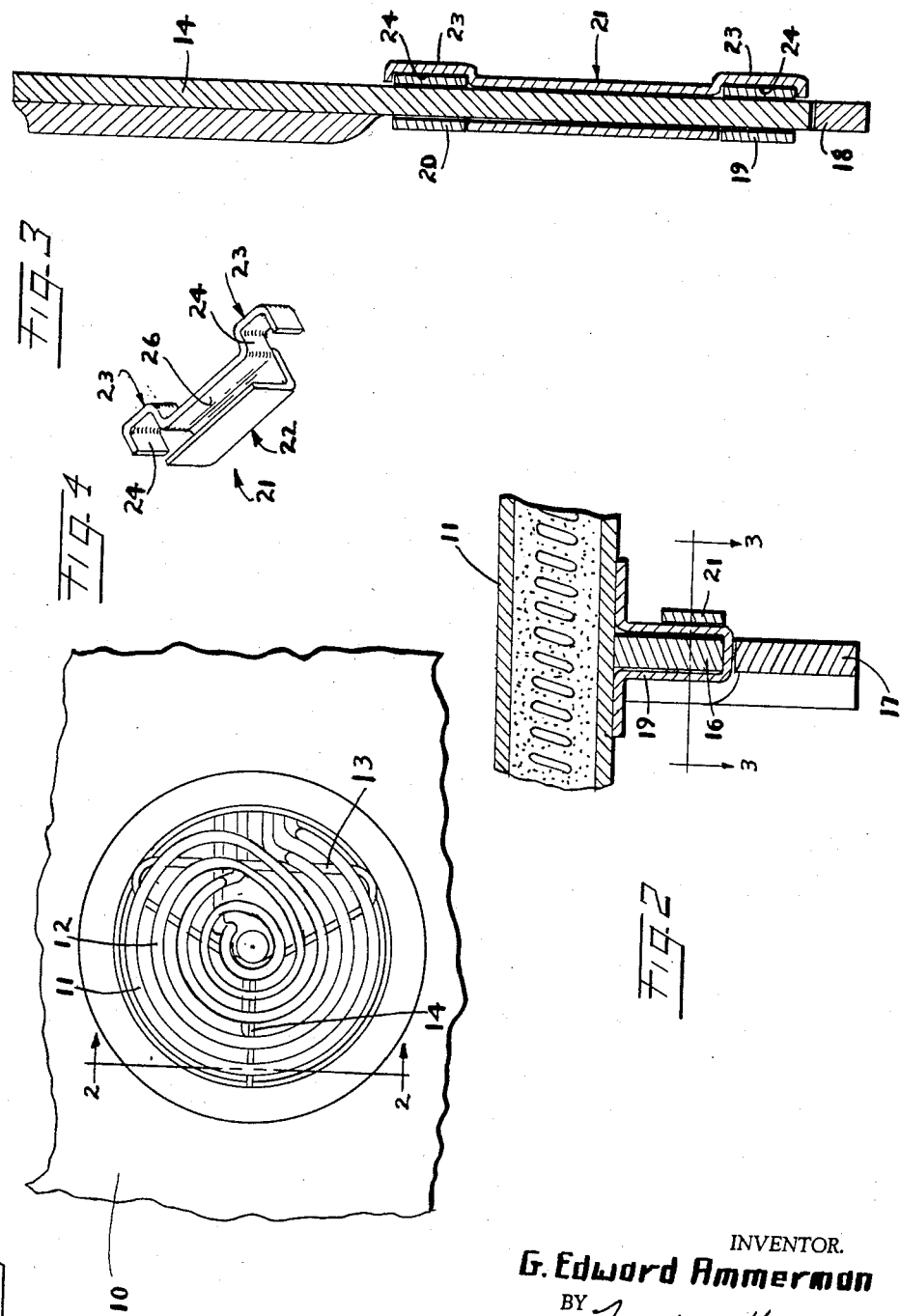
INVENTOR.
G. Edward Ammerman
BY
Michael Williams
Attorney April 7, 1959
G. E. AMMERMAN
2,881,302
ELECTRIC HEATING UNIT
Filed July 24, 1957
2 Sheets-Sheet 2
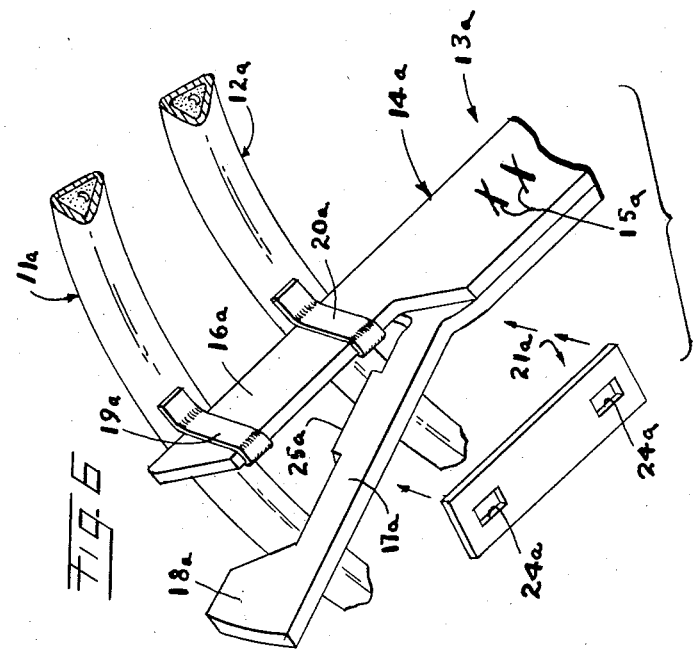
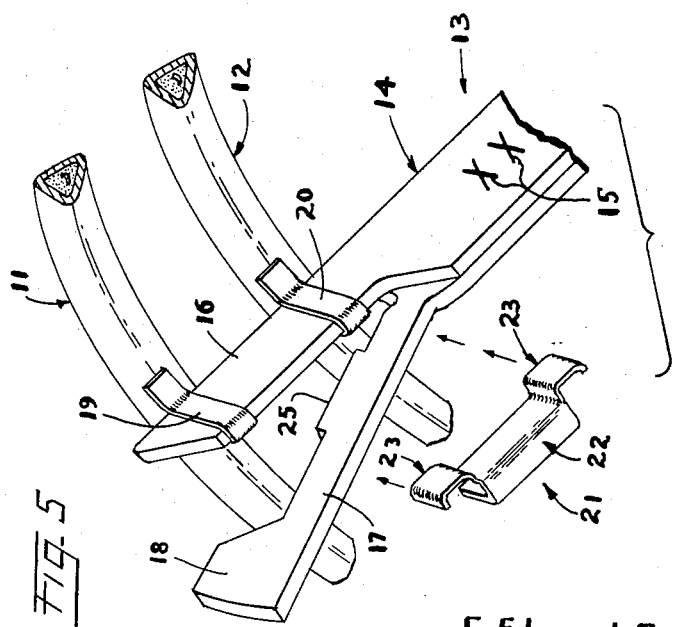
INVENTOR.
G. Edward Ammerman
BY
Attorney

United States Patent Office 2,881,302
Patented Apr. 7, 1959

2,881,302

ELECTRIC HEATING UNIT

George Edward Ammerman, Oakmont, Pa., assignor to The Edwin L. Wiegand Company

Application July 24, 1957, Serial No. 673,830

4 Claims. (Cl. 219—37)

The present invention relates to electric heating units, more particularly to those of the type employed as surface units in electric ranges and the like, and the principal object of the invention is to provide new and improved electric heating units of this character.

In surface type electric heating units constructed of one or more sheathed electric resistance elements formed in a suitable pattern to provide a surface for supporting a vessel to be heated and which elements rest upon and are supported by an underlying support member, various constructions have been devised for securing the elements to be the support members and for maintaining adjoining element portions of each unit in the desired spaced relation. While certain prior art constructions for securing the elements to the support members have been satisfactory, the constructions heretofore employed for maintaining adjoining element portions in spaced relation have not been so because of high manufacturing costs.

The present invention provides a novel construction for maintaining the desired spacing between adjoining element portions, which construction is highly effective yet low in cost. These and other advantages will readily become apparent from a study of the following description and from the drawings appended hereto.

In the drawings accompanying this specification and forming a part of this application there are shown, for purpose of illustration, embodiments which the invention may assume, and in these drawings:

Figure 1 is a top plan view of a surface type heating element constructed in accordance with a preferred embodiment of the present invention, Figure 2 is an enlarged, fragmentary sectional view generally corresponding to the line 2—2 of Figure 1, Figure 3 is a fragmentary sectional view generally corresponding to the line 3—3 of Figure 2, Figure 4 is a perspective view of a detail, Figure 5 is an exploded perspective view illustrating the manner in which the detail shown in Figure 4 is assembled with certain cooperating parts, and Figure 6 is a view similar to Figure 5 but of another embodiment of the invention.

As shown in Figure 1, the heating unit chosen to illustrate the present invention is the well-known surface type unit which is supported substantially flush with the top surface 10 of a domestic range.

Briefly, this unit comprises a pair of elongated, sheathed electric resistance heating elements 11 and 12 so convoluted and cooperable with each other to provide a surface for supporting a vessel to be heated.

Underlying and supporting elements 11, 12 is a support member, or spider, 13 upon which the relatively flexible elements rest. While it is desirable that the elements be secured to the support member, it is desirable that the securement be such that the elements may slide a certain amount, relative to the support member, to provide for expansion and contraction of the elements during temperature changes. Since elements 11, 12 are loosely secured to support member 13, means must be provided for maintaining the elements in the desired spaced relation with each other and a primary object of the present invention is to provide an effective, low cost construction for carrying out this function.

In the present embodiment, support member 13 comprises an elongated metal strip formed to provide a plurality of legs which underlie and support the elements. One of these legs is identified by reference character 14 and is formed by securing together, by welding or the like at 15, respective end portions of the strip from which the support member is formed.

As best seen in Figure 5, the free end of leg 14 is bifurcated to provide portions 16 and 17 for a purpose to be disclosed. In the position of parts shown, portion 16 is adjacent elements 11 and 12 while portion 17 is spaced from the elements. Moreover, portion 17 is shown bent out of the plane of leg 14 so that the portions are in diverging relation; however, at assembly, portion 17 will be bent so that it is in co-extensive relation with portion 16 as shown in Figures 2 and 3. Note that leg portion 17 is somewhat longer than leg portion 16 and is provided with a transverse enlargement at its free end which overlies the free end of leg portion 16, for a purpose to be seen, when the portions are disposed in co-extensive relation.

In the present embodiment, elements 11, 12 are so arranged for cooperation with each other that their respective outermost convolutions are in adjoining relation (see Figure 5). Means are provided for securing such convolutions to support leg 14 and as herein shown, respective depending loop members 19, 20 are welded or otherwise secured to respective outermost convolutions at the point where each crosses the leg and each is of a size to slidably pass leg portion 16.

In an element of the type herein disclosed, it is important that the convolutions of respective elements be maintained in a predetermined spaced relation to obtain maximum heating efficiency; accordingly, means are provided for insuring such desired spacing. In the embodiment shown in Figures 1 through 5, such means comprises a preformed metal spacer member 21 (see especially Figure 4) having a U-shaped intermediate portion 22, and respective end portions 23 providing respective recesses or cavities 24. U-shaped intermediate portion 22 is of a size to straddle support leg portion 16 and cavities 24 are of a size to receive respective loop means 19, 20.

With support leg portion 17 bent out of the plane of the support leg 14 as indicated in Figure 5, support leg portion 16 may be passed through loop means 19, 20 carried by respective outermost convolutions of respective elements 11, 12. Spacer member 21 will then be assembled with support leg portion 16, by moving the spacer member in a sideways direction as indicated by the arrows to dispose its intermediate portion between the loops 19, 20 and to dispose the latter in respective cavities 24. With the spacer member thus seated against support leg portion 16, support leg portion 17 may be bent to alignment with support leg portion 16 to maintain the spacer member assembled with the support leg (see Figures 2 and 3) and to prevent withdrawal of supporting leg portion 16 from loops 19, 20. If desired, portion 17 may have an enlargement 25 (see Figure 5) which clamps the spacer member in position when leg portion 17 is bent to co-extend with leg portion 16.

It will be noted that with the spacer member seated against support leg portion 16, the defining margins of respective cavities 24 (which cavities are spaced-apart an amount determined by the desired spacing of respective elements 11, 12) will confine respective loop means therein and maintain the loop means and consequently the attached elements in the desired spaced relation.

It is an important feature of the present invention that the entrance to cavities 24 is accessible from a side 26 of the spacer member which seats against support leg portion 16. Accordingly the preformed spacer member may be assembled with the elements and the support leg by movement of the spacer member in a sideways direction. This is in direct contrast to certain prior art constructions wherein an incompletely formed spacer member was assembled with the elements by passing it through the loops in much the same manner as leg portion 16 is assembled therewith. These prior art constructions were difficult and time consuming to assemble since most require that the spacer member and the support leg be inserted simultaneously through the loops and that the spacer member be bent to keep it in position following its assembly with the elements.

In the embodiment illustrated in Figure 6, a spacer member 21 takes the form of a flat piece of sheet metal having spaced respective apertures or cavities 24a for receiving loops 19a, 20a carried by elements 11a, 12a. With the elements and the support leg 14a disposed as shown in Figure 6, assembly of the spacer member with the elements and the support leg merely requires that the spacer member be seated against support leg portion 16a in manner whereby the bight portions of loops 19a, 20a are disposed in respective apertures 24a of the spacer member. Support leg portion 17a will then be bent to co-extending relation with leg portion 16a to thereupon maintain the spacer member assembled with the elements and the support member.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only and that my invention is not limited thereto.

I claim:

1. A surface type electric heating unit for ranges and the like comprising a pair of elongated, sheathed electric resistance heating elements each having a plurality of convolutions which are to be maintained in predetermined spaced relation and which are cooperable to provide a generally plane heating surface for supporting vessel to be heated, means underlying and supporting said elements, and an elongated spacer member of a length to extend between adjoining convolutions of respective elements and having a pair of cavities spaced apart an amount equal to the desired spacing of said adjoining element convolutions and each cavity having spaced, oppositely facing margins for receiving respective adjoining element portions therebetween, one side of said spacer member being adapted to seat against said supporting means and entrance to said cavities being accessible from said one side of said spacer member to provide for assembly of the latter with said elements by relative movement therebetween in a direction sideways of said spacer member, respective adjoining element portions being disposed within respective spacer member cavities upon assembly of said spacer member with said element portions and the defining margins of respective cavities confining respective element portions therewithin to maintain said element portions in the desired spaced relation.

2. A surface type electric heating unit for ranges and the like comprising a pair of elongated, sheathed electric resistance heating elements each having a plurality of convolutions which are adapted to be maintained in predetermined spaced relation and which are cooperable to provide a generally plane heating surface for supporting a vessel to be heated, loop means depending from adjoining convolutions of respective elements, support means underlying and supporting said elements and extending through said loop means to maintain said elements in assembled relation with said support means, and an elongated spacer member of a length to extend between said loop means and having a pair of cavities spaced apart an amount determined by the desired spacing of said adjoining element convolutions and each cavity having spaced, oppositely facing margins for receiving respective loop means therebetween, one side of said spacer member being adapted to seat against said support means and entrance to said cavities being accessible from said one side of said spacer member to provide for assembly of the latter with said loop means by relative movement therebetween in a direction sideways of said spacer member, respective loop means being disposed within respective spacer member cavities upon assembly of said spacer member with said loop means and the defining margins of respective cavities confining respective loop means therewithin to maintain said adjoining element convolutions in the desired spaced relation.

3. A surface type electric heating unit for ranges and the like comprising a pair of elongated, sheathed electric resistance heating elements each having a plurality of convolutions which are adapted to be maintained in predetermined spaced relation and which are cooperable to provide a generally plane heating surface for supporting a vessel to be heated, loop means depending from adjoining convolutions of respective elements, support means underlying and supporting said elements and having a bifurcated portion at least one of whose furcations may be bent relative to the other from a first position wherein said furcations are in diverging relation to a second position wherein said furcations are in generally co-extensive relation and one of said furcations extending through said loop means to maintain said elements in assembled relation with said support means, and an elongated spacer member having a U-shaped portion for straddling said one support means furcation and being of a length to extend between said loop means and having a pair of cavities spaced apart an amount determined by the desired spacing of said adjoining element convolutions, entrance to said loop means cavities being accessible from a side of said spacer member adjacent said one support means furcation to provide for assembly of the latter with said loop means and said support means by relative movement therebetween in a direction sideways of said spacer member when said furcations are disposed in said one position, said spacer member being held assembled with said support means when said furcation are disposed in said second position and respective loop means being disposed within respective spacer member cavities upon assembly of said spacer member with said loop means and the defining margins of respective cavities confining respective loop means therewithin to maintain said adjoining element convolutions in the desired spaced relation.

4. A surface type electric heating unit for ranges and the like comprising a pair of elongated, sheathed electric resistance heating elements each having a plurality of convolutions which are adapted to be maintained in predetermined spaced relation and which are cooperable to provide a generally plane heating surface for supporting a vessel to be heated, loop means depending from adjoining convolutions of respective elements, support means underlying and supporting said elements and having a bifurcated portion at least one of whose furcations may be bent relative to the other from a first position wherein said furcations are in diverging relation to a second position wherein said furcations are in generally co-extensive relation and one of said furcations extending through said loop means to maintain said elements in assembled relation with said support means, and an elongated spacer member having an intermediate, U-shaped main body portion for straddling said one support means furcation intermediate respective loop means and having end portions providing respective cavities spaced apart an amount determined by the desired spacing of said adjoining element convolutions, entrance to said loop means cavities being accessible from a side of said spacer member adjacent said one support means furcation to provide for assembly of the latter with said loop means and said support means by relative movement therebetween in a direction sideways of said spacer member when said furcations are in said one position, said spacer member being held assembled with said support means when said furcations are disposed in said second position and respective loop means being disposed within respective spacer member cavities upon assembly of said spacer member with said loop means and said support means and the defining margins of respective cavities confining respective loop means therewithin to maintain said adjoining element convolutions in the desired spaced relation.

References Cited in the file of this patent

UNITED STATES PATENTS

| | | |
|---|---|---|
| 2,413,478 | Wiegand | Dec. 31, 1946 |
| 2,667,564 | Cunningham | Jan. 26, 1954 |
| 2,725,456 | Weyrick | Nov. 29, 1955 |